(12) United States Patent
Jeong et al.

(10) Patent No.: US 6,396,654 B2
(45) Date of Patent: May 28, 2002

(54) EMBEDDED SERVO WRITING METHOD AND APPARATUS FOR HARD DISK DRIVE

(75) Inventors: Woo-Cheol Jeong; Chang-Ik Kang, both of Seoul (KR)

(73) Assignee: SamSung Electronics, Co., Ltd., Suwon (KR)

(*) Notice: Subject to any disclaimer, the term of this patent is extended or adjusted under 35 U.S.C. 154(b) by 0 days.

(21) Appl. No.: 09/035,755

(22) Filed: Mar. 6, 1998

(30) Foreign Application Priority Data

Mar. 6, 1997 (KR) ............................... 97-7359

(51) Int. Cl.$^7$ ............................................. G11B 15/46
(52) U.S. Cl. .................. 360/77.08; 360/51; 360/75; 360/77.02; 360/77.05
(58) Field of Search ................... 360/75, 51, 77.02, 360/77.05, 77.08

(56) References Cited

U.S. PATENT DOCUMENTS

| | | | |
|---|---|---|---|
| 4,414,589 A | * 11/1983 | Oliver et al. | ........ 360/77.08 X |
| 4,584,619 A | * 4/1986 | Nay et al. | ..................... 360/75 |
| 4,630,190 A | 12/1986 | Alaimo et al. | |
| 4,757,406 A | 7/1988 | Stewart et al. | |
| 4,796,131 A | 1/1989 | Mathewson | |
| 4,879,617 A | 11/1989 | Sampietro et al. | |
| 5,132,854 A | * 7/1992 | Tsuyoshi et al. | ..... 360/77.08 X |
| 5,164,863 A | 11/1992 | Janz | |
| 5,168,398 A | 12/1992 | Kanda et al. | |
| 5,241,430 A | 8/1993 | Janz | |
| 5,255,136 A | 10/1993 | Machado et al. | |
| 5,262,907 A | 11/1993 | Duffy et al. | |
| 5,325,349 A | 6/1994 | Taniguchi | |
| 5,355,260 A | 10/1994 | Mikada | |
| 5,375,020 A | * 12/1994 | Aggarwal et al. | ............ 360/75 |
| 5,455,726 A | 10/1995 | Liu | |
| 5,570,241 A | * 10/1996 | Nielsen et al. | ................ 360/46 |
| 5,570,247 A | 10/1996 | Brown et al. | ................. 360/75 |
| 5,602,693 A | 2/1997 | Brunnett et al. | |
| 5,616,869 A | 4/1997 | Valent | |
| 5,677,609 A | 10/1997 | Khan et al. | |
| 5,687,038 A | 11/1997 | Sugawara et al. | |
| 5,715,119 A | 2/1998 | Williams et al. | |
| 5,748,398 A | * 5/1998 | Seo | ..................... 360/77.08 X |

FOREIGN PATENT DOCUMENTS

JP 3-187012 * 8/1991

* cited by examiner

Primary Examiner—David Hudspeth
Assistant Examiner—Mitchell Slavitt
(74) Attorney, Agent, or Firm—Robert E. Bushnell, Esq.

(57) ABSTRACT

A method and apparatus for writing a servo signal for controlling the position of a head on a disk during the manufacture of a hard disk drive. The present invention provides a method and apparatus for writing servo information on a magnetic disk through a magnetic head by driving an actuator of a hard disk drive (HDD) directly without employing a servo writer using control of a laser. Furthermore, when there is need for increasing the density in tracks per inch (TPI) to obtain a high capacity HDD, HDD manufacturers do not have to produce a new servo writer, thereby reducing production cost.

26 Claims, 8 Drawing Sheets

EMBEDDED SERVO WRITING METHOD AND APPARATUS FOR HARD DISK DRIVE

CLAIM OF PRIORITY

This application makes reference to, incorporates the same herein, and claims all benefits accruing under 35 U.S.C. § 119 from an application entitled *Embedded Servo Writing Method and Apparatus for Hard Disk Drive* earlier filed in the Korean Industrial Property Office on Mar. 6, 1997, and there duly assigned Ser. No. 97-7359 by that Office.

BACKGROUND OF THE INVENTION

1. Technical Field

The present invention relates to a hard disk drive, and more particularly to a method and apparatus for writing a servo signal for controlling the position of a head on a disk during the manufacture of a hard disk drive.

2. Related Art

In general, a hard disk drive(hereinbelow, referred to as HDD) widely used as an auxiliary memory device in a computer system is a disk driving/recording apparatus for magnetically recording the data received from an external device(e.g., a host computer) onto a rotating disk (i.e., a magnetic recording medium) or reading the data recorded on the disk by using a magnetic head. The HDD enables high speed access to a large amount of data. Such data are typically stored within sectors on radially concentric tracks located across the disk. The data stored on the tracks are read or written by access of the data by the magnetic head. The magnetic head moves over the tracks across the disk radially under the control of a head position servo mechanism so that it can be positioned selectively over any one selected track among several tracks. In order to selectively position the head over the specific track, a present position of the head associated with each of tracks should be determined. Servo information indicative of the present position of the head relating to each of tracks is provided by using a specific servo pattern read from a magnetic disk by a head. The servo pattern, which is detected by the head during the access of data on the magnetic disk, is used as track position information. The method of writing such servo information on a disk basically comprises a dedicated servo method and an embedded servo method. For the dedicated servo method, the servo information is written on an entire surface of any one disk of a plurality of tracks, and is then read by a special servo head. As a result, the use of the read servo information controls the position of the heads over the surface of other disks. For the embedded servo method, servo information and data are alternately positioned on each track of an entire surface of each of a plurality of disks.

As will be explained in more detail below, the embedded servo method of writing servo information during the manufacture of a HDD has a problem in that high-priced equipment, such as laser equipment, is required to control the driver which is linked to an actuator of the HDD and to provide driving power. Furthermore, whenever HDD manufacturers attempt to increase the density (tracks per inch) of the HDD in order to achieve a high capacity HDD, they are compelled to produce a new servo writer, and this increases production cost accordingly.

Therefore, there is a need for the development of a method of writing servo information on a magnetic disk by directly driving an actuator of an HDD without the use of a mechanical device of a servo writer by means of control of expensive equipment, such as a laser. That is to say, there is a need to develop a method of writing servo information on a magnetic disk such that high-priced equipment, such as laser equipment, is not required to control the driver linked to the actuator of an HDD and to provide driving power.

The following patents are considered to be representative of the prior art relative to the invention disclosed therein, but are burdened by the disadvantages discussed herein:

U.S. Pat. No. 5,715,119 to Williams et al. discloses a *Rotating Crash Stop Assembly For Hard Disk Drives in Which a Crash Stop Is Used For an Actuator Arm For a Hard Disk Drive*; U.S. Pat. No. 5,687,038 to Sugawara et al. discloses a *Servo Method and Device for Controlling Head Position for a Hard Disk Drive*; U.S. Pat. No. 5,677,609 to Khan et al. an *Intelligent Servomechanism Controller for Controlling the Movement and Positioning of a Servo Mechanism for the Read/write Heads of a Hard Disk*; U.S. Pat. No. 5,616,869 to Valent an *Actuator Torque Non-Linearity Compensation Technique for Hard Disk Drives*; U.S. Pat. No. 5,602,693 to Brunnett et al. a *Method and Apparatus for Positioning a Plurality of Heads Traversing Multiple Disks in a Disk Drive System*; U.S. Pat. No. 5,570,247 to Brown et al. discloses a *Self Servo Writing File and Method for Writing Servo Patterns in a Direct Access Storage Device*; U.S. Pat. No. 5,455,726 to Liu discloses a *Versatile Head Positioner Stop Which Bidirectionally Limits Movement of a Head Positioning Device in a Disk Drive System*; U.S. Pat. No. 5,355,260 to Mikada discloses a *Servo System for a Hard Disk Drive in Which a Malfunction Detection Circuit Monitors a Period of a Sync Signal Contained in a Servo Data*; U.S. Pat. No. 5,325,349 to Taniguchi discloses a *Hard Disk Drive and a Servo Signal Writing Apparatus*; U.S. Pat. No. 5,262,907 to Duffy et al. discloses a *Hard Disk Drive with Improved Servo System*; U.S. Pat. No. 5,255,136 to Machado et al. discloses a *High Capacity Submicro-Winchester Fixed Disk Drive*; U.S. Pat. No. 5,241,430 to Janz discloses a *Method and Apparatus for Alternatively Reading or Writing Data to a Servo Surface of a Hard Disk Drive*; U.S. Pat. No. 5,168,398 to Kanda et al. discloses a *Head Positioning Control Apparatus for a Data Storage Device*; U.S. Pat. No. 5,164,863 to Janz discloses a *Method for Writing Servo Patterns to a Disk of a Hard Disk Drive*; U.S. Pat. No. 4,879,617 to Sampietro et al. discloses an *Actuator Assembly for a Hard Disk Drive*; U.S. Pat. No. 4,796,131 to Chang discloses a *Winchester or Hard Disk Drive with a Head Positioner Provided with a Bidirectional Preloaded Stop*; U.S. Pat. No. 4,766,508 to Mathewson discloses the *Control of Head Position in Accordance with Prerecorded Sets of Burst Data*; U.S. Pat. No. 4,757,406 to Stewart et al. discloses a *High Capacity Disk Drive and Related Method for Generating and Protecting Hard Sector Pulses Using the Read/Write Heads of a Disk Drive*; and U.S. Pat. No. 4,630,190 to Alaimo et al. discloses a *Servo Control Apparatus for Controlling a Servo Means That Positions a Recording Head over a Storage Medium*.

SUMMARY OF THE INVENTION

It is, therefore, an object of the present invention to provide a method and apparatus for writing servo information on a magnetic disk by directly driving an actuator of an HDD without using a mechanical device of a servo writer by means of the control of a laser.

This and other objects of the present invention have been attained by providing a method of writing servo information on the surface of a plurality of disks in a HDD, comprising the steps of:

(a) positioning each of a plurality of heads over an outermost circumferential track disposed on the surface of corresponding disks in such a manner that the actuator, including a plurality of heads in the HDD, contacts an outer crash stop based on a control command for writing servo information;

(b) causing each of the plurality of heads to write corresponding head position identifying information on a first half track area of the outermost circumferential track based on the control command for writing servo information;

(c) moving each of the plurality of heads inwardly by ½ track across the disk so that each head can be positioned over a second half track area of the outermost circumferential track area by using the written corresponding head position identifying information as a position control value;

(d) causing each of a plurality of said heads to write corresponding head position identifying information on the second half track area of the outermost circumferential track;

(e) sequentially moving each of the plurality of heads inwardly by ½ track across the disk toward the next track in the same manner as the step (c);

(f) causing each of the plurality of heads to write a plurality of head position identifying information on the disk in the same manner as in step (d), thereby writing servo information on the all tracks of said surfaces of said disks.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
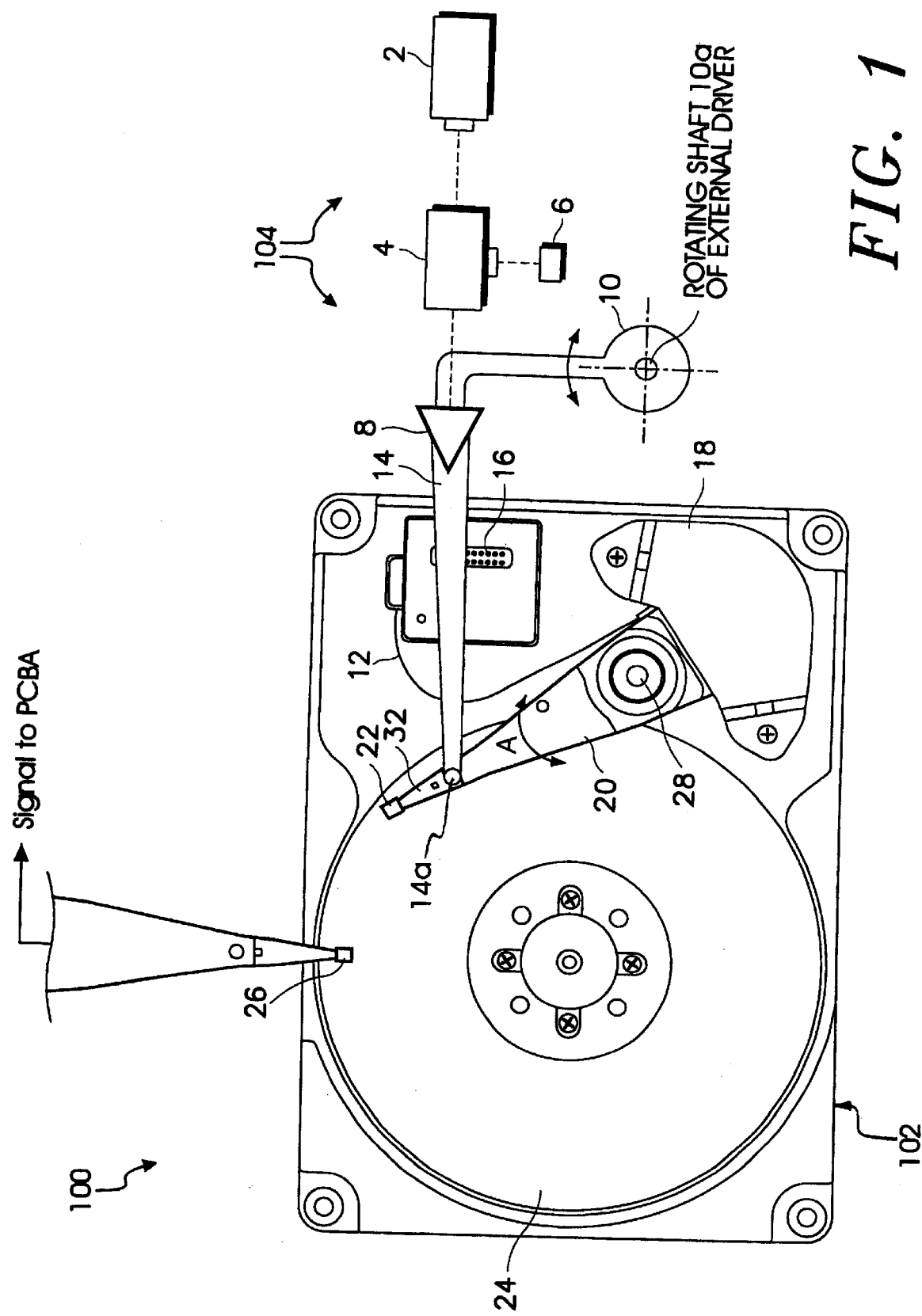
FIG. 1 is a schematic view illustrating a servo writing device for controlling the servo writing of a general HDD

Now, a preferred embodiment of the present invention will be described in detail with reference to the accompanying drawings. Throughout the drawings, it is noted that the same reference numerals or letters will be used to designate like or equivalent elements having the same function. The detailed descriptions of known function and construction unnecessarily obscuring the subject matter of the present invention will be avoided hereinafter. Technical terms, as will be mentioned hereinbelow, are terms defined in consideration of their function in the present invention, which may be varied according to the intention of user, so that the terms should be defined based on the contents of this specification.

A device for writing servo information by the embedded servo method during the manufacture of a general HDD will now be described in detail with reference to FIG. 1.

FIG. 1 is a schematic view illustrating the mechanical construction of a servo writing device for controlling the servo writing of a general hard disk drive.

Referring to FIG. 1, the servo writing device 100 includes the HDD 102 and a servo writer 104. The servo writing operation of the HDD 102 is performed by using the servo writer 104. A mechanical link 14 allows an actuator arm 20 of the HDD 102 and a retro-reflector 8 of the servo writer 104 to be connected together, and the servo writer supplies power to the HDD 102 so that the actuator arm 20 can be driven. The mechanical link 14 connected with the retro-reflector 8 of the servo writer 104 is linked to a swaging hole 14a connecting the actuator arm 20 and a suspension 32 at which a magnetic head 22 is mounted.

For this reason, when the retro-reflector 8 of the servo writer 104 is driven under the control of an external laser 2, the actuator arm 20 of the HDD 102 is driven in cooperation with the retro-reflector 8, thus causing the position of the magnetic head 22 over a magnetic disk 24 to be controlled. A laser beam interferometer 4 disposed between the retro-reflector 8 and the external laser 2 receives a driving control beam outputted from the external laser 2, and transmits the received driving control beam to a beam receiving sensor 6 which in turn senses the driving control beam outputted from the external laser 2. As a consequence, when the position of the retro-reflector 8 is determined, the position of the mechanically linked actuator arm 20 of HDD 102 is fixed by a designed dimension of an external mechanism. As an external driver 10, to which the retro-reflector 8 is connected, is rotated around its rotating shaft 10a, the actuator arm 20 of HDD 102 is rotated radially (see arrow A in FIG. 1) around pivot bearing 28 in the opposite direction with respect to the direction in which the mechanical link 14 moves. Therefore, a sync clock signal recorded on the outermost circumferential track of the magnetic disk 24 during the manufacture of HDD 102 is read by a clock head 26 through the driving of such mechanical device, and then the read sync clock signal is applied to a PCBA (not shown in FIG. 1) received in socket 16 in the HDD 102 so that the magnetic head 22 can write servo information on magnetic disk 24 while the head 22 moves over the disk 24. However, in such a servo writing device, there has been a problem in that high-priced equipment, such as a laser, is required to control the driver which is linked to the actuator arm 20 of HDD 102 and to provide driving power. In addition, every time HDD manufacturers try to increase the density in tracks per inch (TPI) of the HDD to achieve a high capacity HDD, they have to produce a new servo writer, thereby increasing the production cost.

Figure 2:
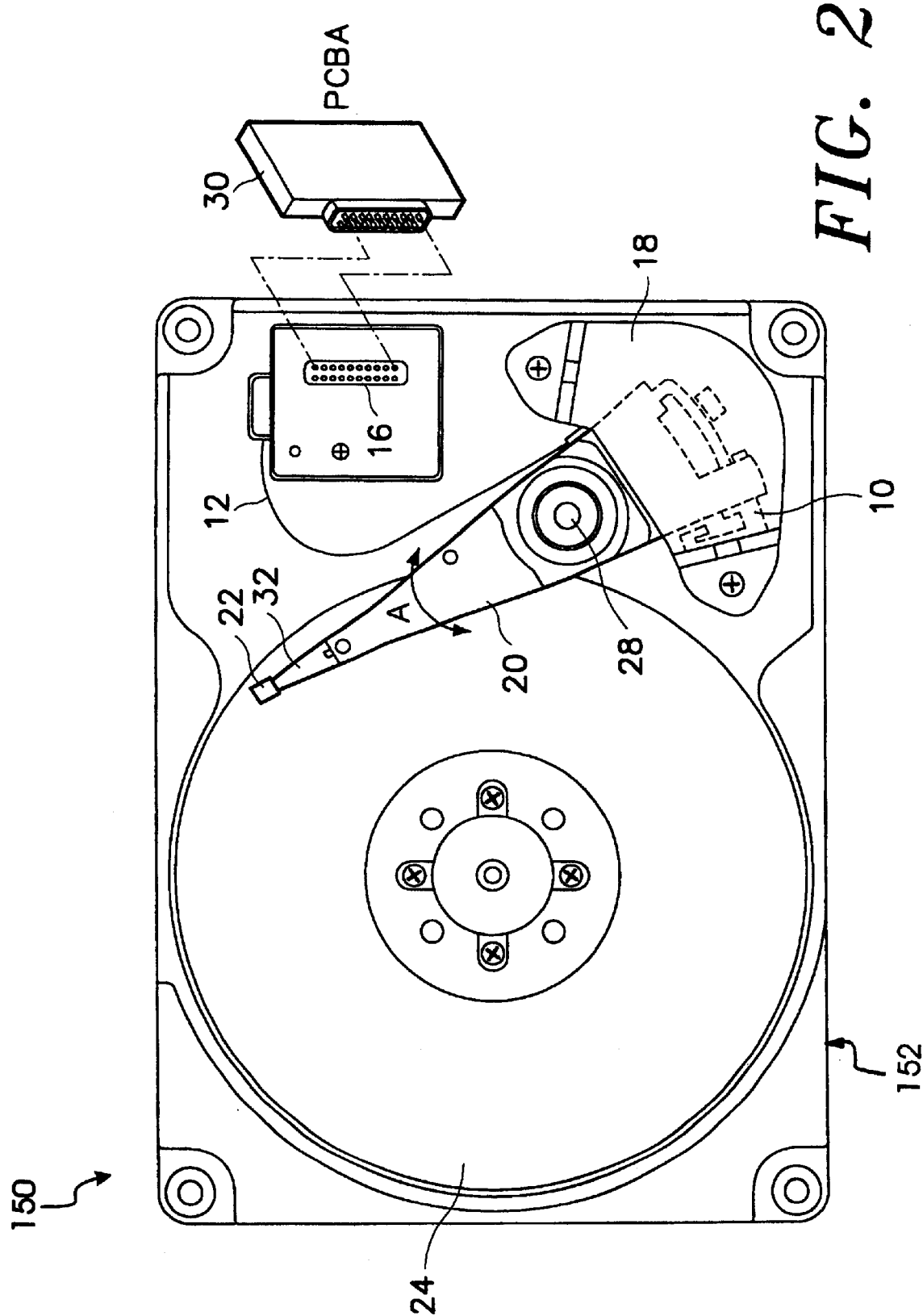
FIG. 2 is a schematic view illustrating a servo writing system for controlling the servo writing of a HDD according to an embodiment of the present invention.

FIG. 2 is a schematic view illustrating a servo writing system for controlling the servo writing of the HDD according to an embodiment of the present invention.

The servo writing system 150 shown in FIG. 2 is generally similar to the servo writing device 100 shown in FIG. 1, and thus elements common to both FIGS. 1 and 2 are indicated by identical reference numerals. It should be noted that, in contrast to FIG. 1, FIG. 2 shows a PCBA 30 which is insertable into socket 16 in HDD 152.

The servo writing system 150 receives servo writing formation from an external source (not shown) and enables a micro-controller included therein (but also not shown)to control the driving of actuator arm 20 to perform the servo writing operation.

Previously, the use of a clock head of a servo writer allowed a magnetic head to be positioned over an outermost track. In the present invention, the magnetic head is positioned over the outermost track by contact between the actuator arm 20 and an outer crash stop 10 included in a voice coil motor (VCM) 18.

Figure 3:
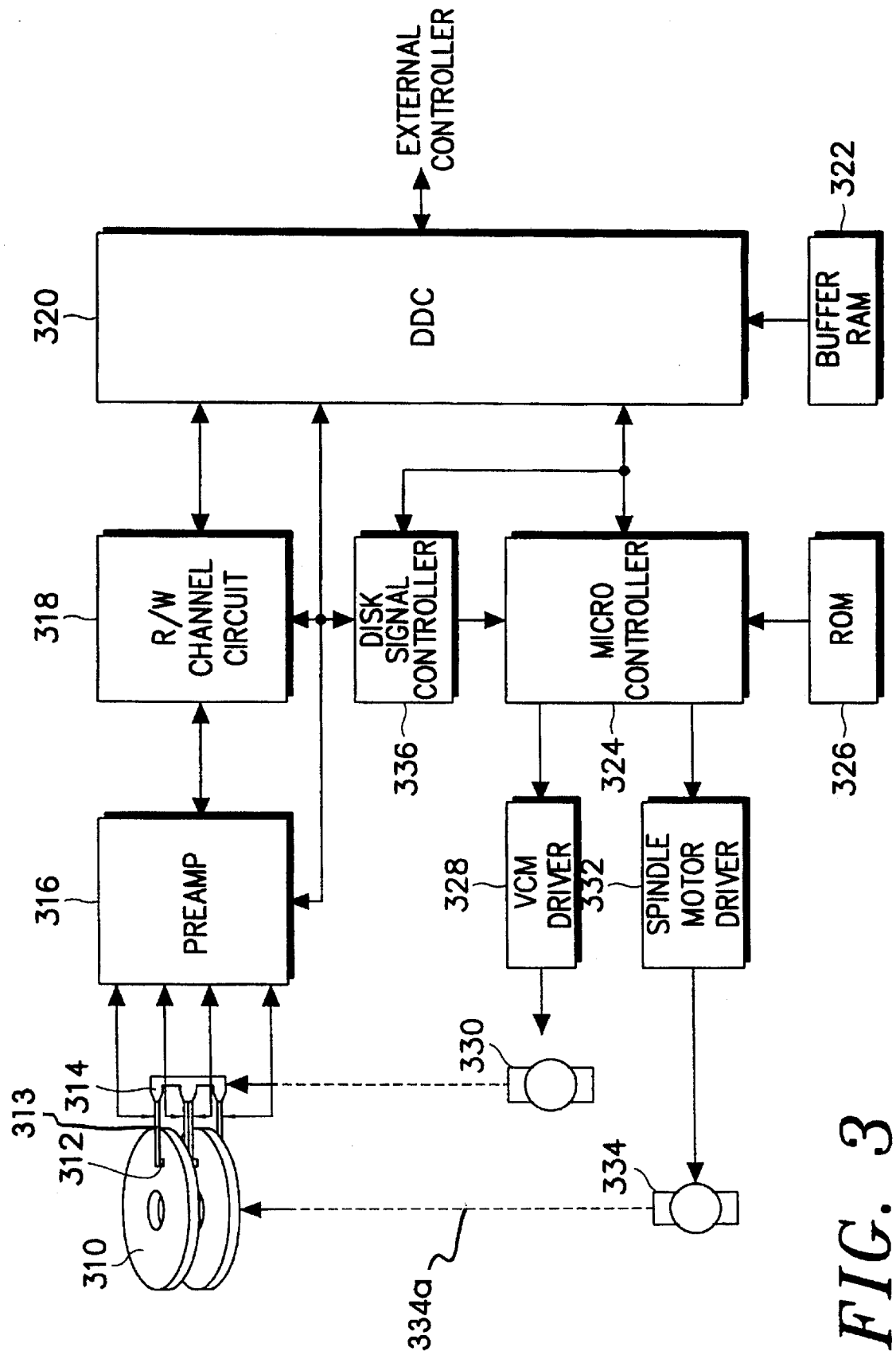
FIG. 3 is a block diagram illustrating the inner construction of the HDD for servo writing according to an embodiment of the present invention.

FIG. 3 is a block diagram illustrating the inner construction of the HDD for servo writing according to an embodiment of the present invention.

Referring to FIG. 3, disks 310 (which normally assume the form of a stack) are rotatably mounted on a driving shaft 334a of a spindle motor 334, and there is typically a single magnetic head 312 for each disk surface. Each magnetic head 312 is positioned on a surface of a magnetic disk 310 and is installed at one end of an actuator arm 313 extending vertically toward the disk 310 from an E-shaped block assembly 314 coupled with an actuator 330 having a rotary voice coil motor (VCM). During a data read operation, a pre-amplifier 316 which is coupled to a read/write (R/W) channel circuit 318 pre-amplifies a read signal picked up by one of the heads 312, and provides the preamplified analog read signal to the R/W channel circuit 318. During a data write operation, pre-amplifier 316 enables encoded write data from the R/W channel circuit 318 to be written on a surface of the disk 310 through the driving of a corresponding one of the heads 312. At this time, the pre-amplifier 316 selects one of the heads 312 under the control of a disk data controller (DDC) 320.

The R/W channel circuit 318, which is coupled to the pre-amplifier 316, a disk signal controller 336 and the DDC 320, detects and decodes a data pulse from the read signal received from the pre-amplifier 316, and generates read data which is provided to the DDC 320. R/W channel circuit 318 encodes write data from the DDC 28 for provision to the pre-amplifier 316. Further, the R/W channel circuit 318 demodulates head position information, which is part of servo information written on the disk 310, to generate a position error signal (PES). The DDC 320 enables data received from an external controller to be written on the surface of the disk through R/W channel circuit 318 and the pre-amplifier 316 in response to a data read/write command received from the external controller, or transmits the data read from the disk 312 to the host computer. In addition, the DDC 320 serves a communications interface between the host computer and the micro-controller 324, as well as between the host computer and the R/W channel circuit 318. A buffer RAM 322 temporarily stores data transmitted between the host computer and the micro-controller 324, as well as between the host computer and the R/W channel circuit 318. The micro-controller 324 controls the DDC 320 in response to a data read/write command received from the external controller, and controls track seek and track following operations. Read-only memory (ROM) 326 stores an executing program and various setting values for the micro-controller 324. The VCM driver 328 generates driving current for driving the actuator 330 based on a servo control signal for controlling the position of the head 310 generated by the micro-controller 324, and then provides the driving current for the VCM of the actuator 330. Disposed on one end of an actuator arm is the VCM, and the heads 312 are attached at the other end thereof. The VCM of the actuator 330 moves the head 312 horizontally over the track on the magnetic disk 310 in correspondence with a direction and a level of driving current supplied by the VCM driver 328. The spindle motor driver 332 drives the spindle motor 334 according to a control value for the rotation control of the disks 312 as generated by the micro-controller 324 so as to rotate the disk 310. A disk signal controller 336 generates various timing signals required for the read/write operation under the control of the micro-controller 324, decodes servo information, and supplies the decoded servo information to the micro-controller 324.

Figure 4:
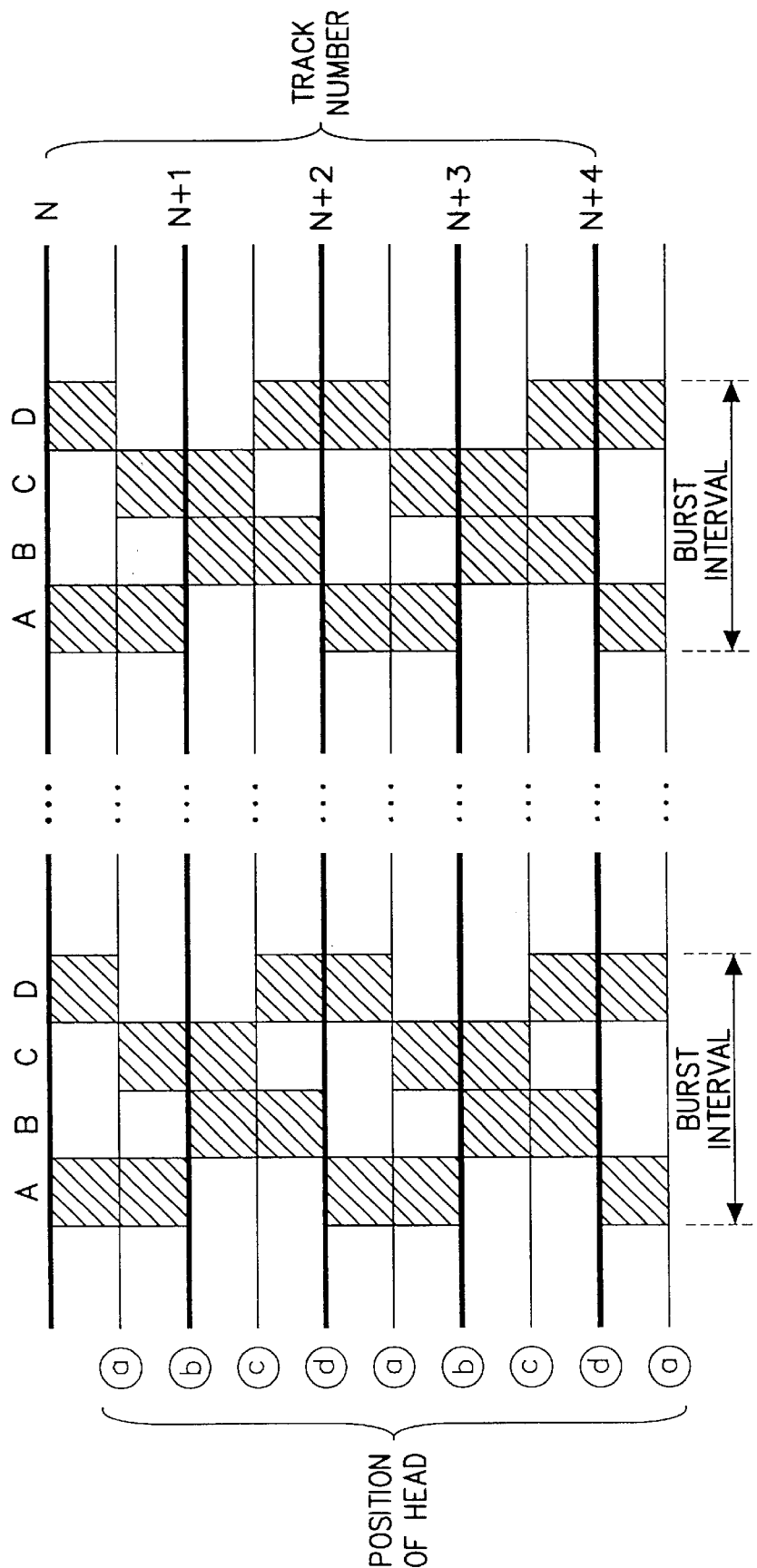
FIG. 4 is a diagram illustrating A,B,C and D servo burst patterns with respect to track placement according to an embodiment of the present invention.

FIG. 4 is a diagram illustrating a format for writing four servo burst signals (A,B,C and D) according to an embodiment of the present invention.

Referring to FIG. 4, the heads 312 write four burst signals, with the heads 312 being moved by ½ of a track area between a track(e.g., N-th track) and the next track(e.g., N+1-th track) in the inner diameter direction from an outermost circumferential track on the disks.

Figure 5:
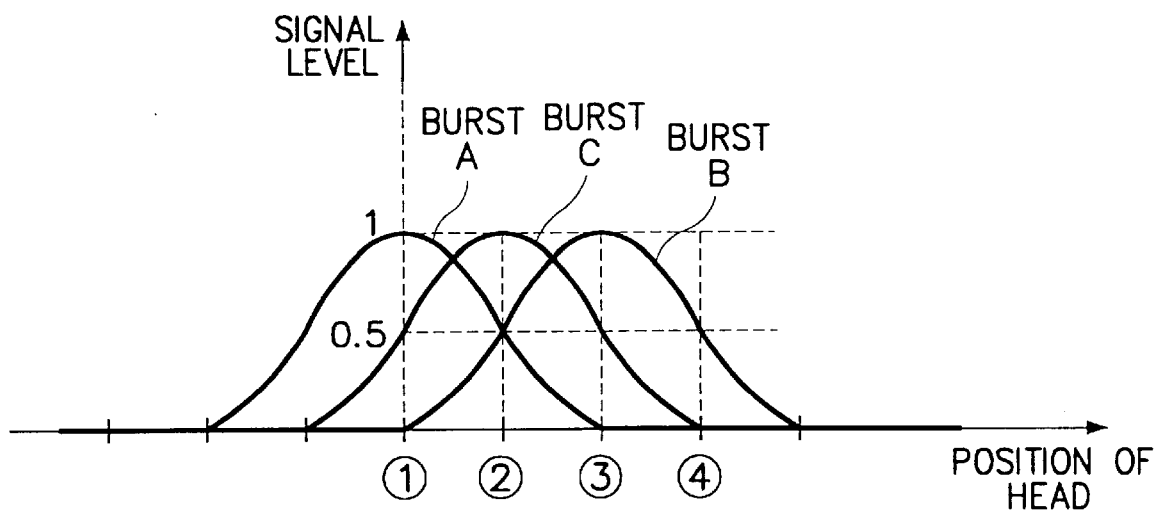
FIG. 5 is a waveform chart of detected burst signals for controlling the position of a head according to an embodiment of the present invention.

FIG. 5 is a waveform chart of detected burst signals for controlling the position of a head according to an embodiment of the present invention.

Referring to FIG. 5, for example, a signal level point of a maximum value is normalized as 1 in a detected waveform of burst signal A written at the first position of a head, and the head 312 moves to a 0.5 point of the detected waveform of burst signal A.

Figure 6:
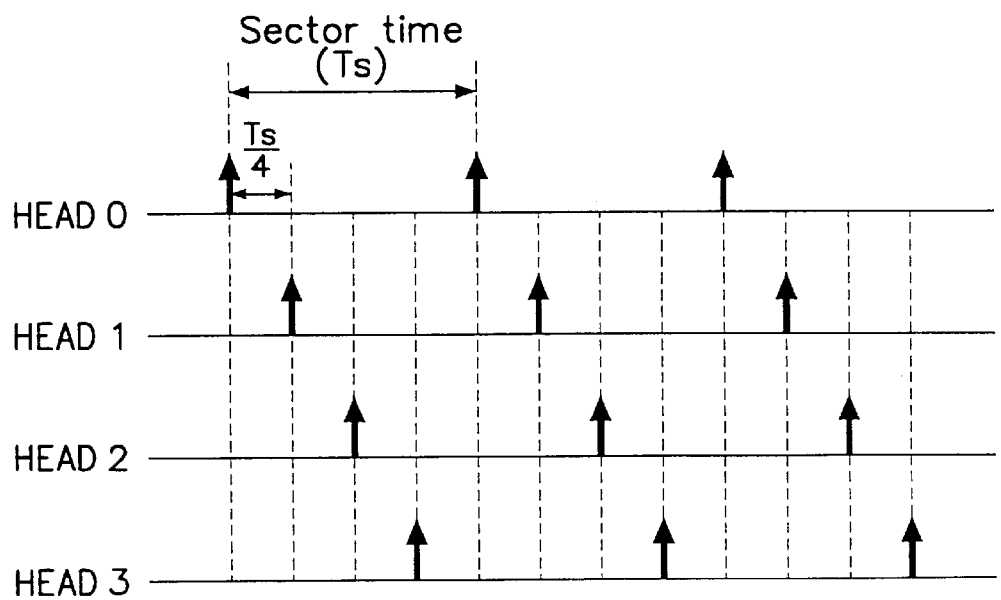
FIG. 6 is a timing diagram for a servo sector between a plurality of heads according to an embodiment of the present invention.

FIG. 6 is a timing diagram for a servo sector between a plurality of heads, (i.e., 4 heads) included in a HDD according to an embodiment of the present invention.

Referring to FIG. 6, when a servo sector sync time ($T_s$) of a first head 0 is set to a criterion, the next heads 1 thru 3 write burst signals by successively delaying each servo sector sync time by $¼(T_s)$.

Figure 7A:
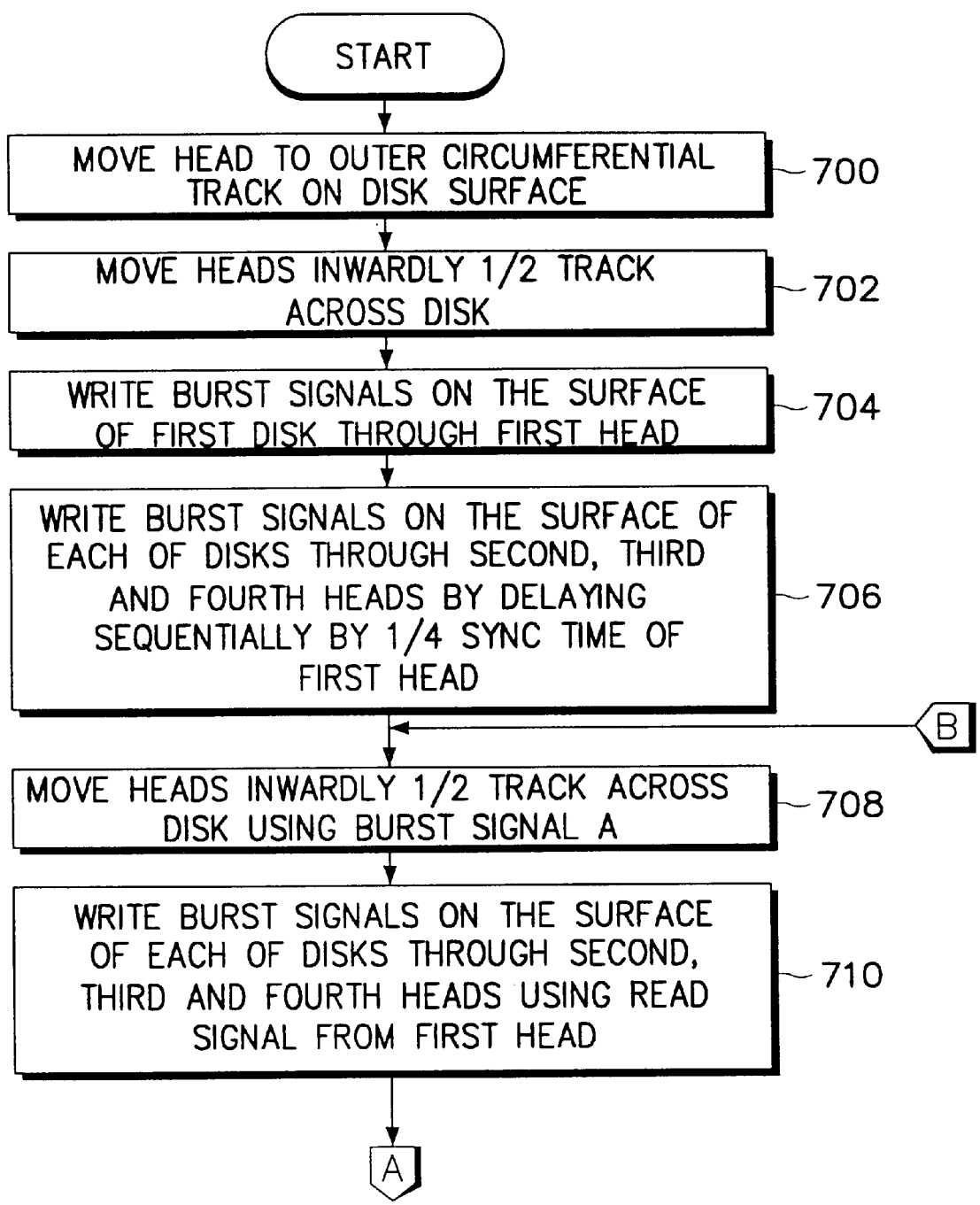
FIGS. 7A and 7B are a flowchart illustrating a process routine for the servo writing of the HDD according to an embodiment of the present invention.
Figure 7B:
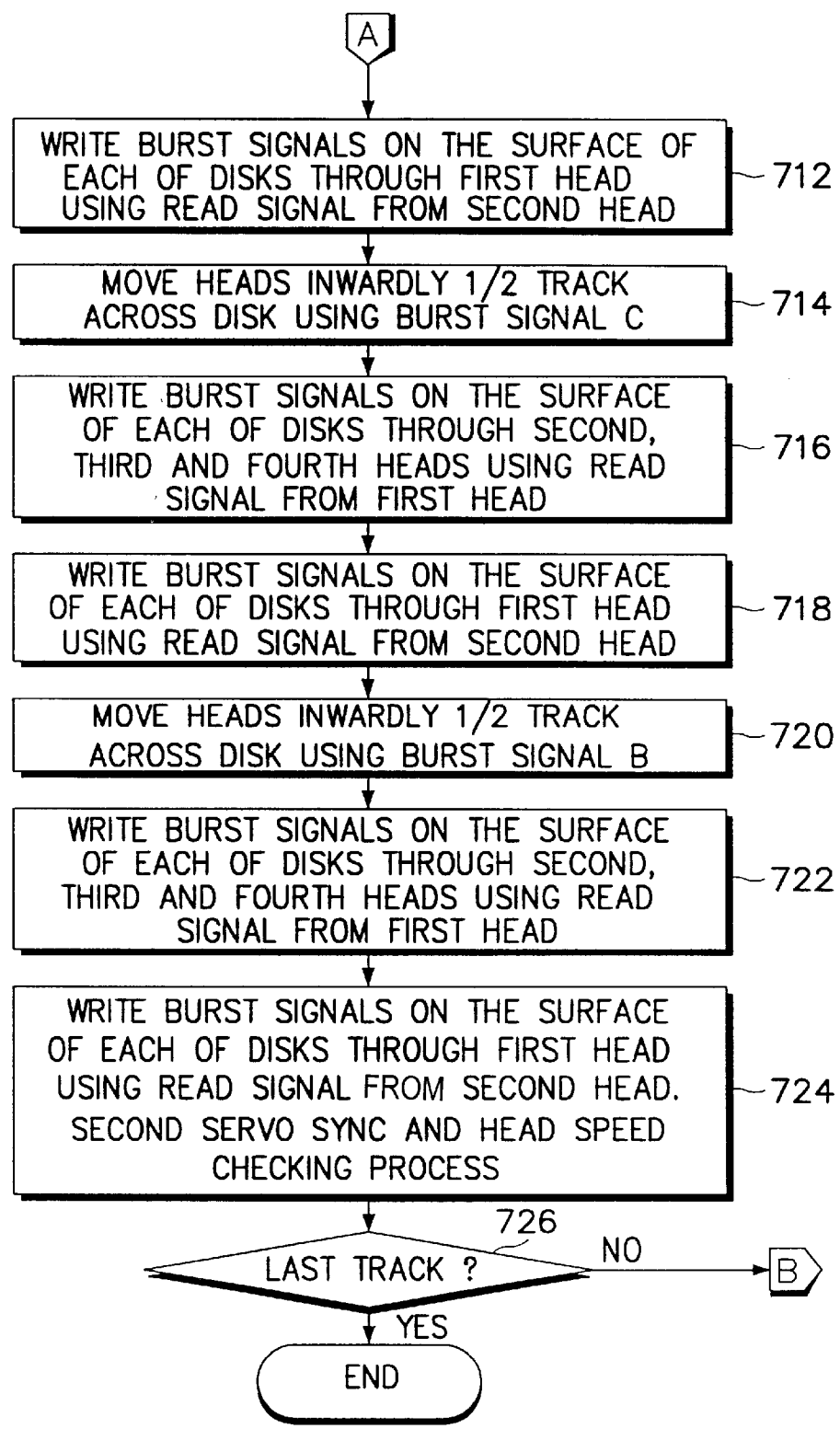

FIGS. 7A and 7B are a flowchart illustrating a process routine for the servo writing of the HDD according to an embodiment of the present invention.

The servo writing process of the HDD will be described hereinafter with reference to FIGS. 2 to 6.

At step 700, the micro-controller 324 controls the VCM driver 328 based on a servo write command from ROM 326, allows a constant current to be applied to the VCM of actuator 330 from the VCM driver 328, and allows the heads 312 to be moved to an outermost circumferential track on the disks 310, and to be stopped at the outermost circumferential track through the driving of the VCM driver 328. At this point, a side end of the actuator 330 contacts an outer crash stop 10 included in the VCM, so that the heads 312 are positioned at the outermost circumferential track. After that, in step 702, the micro-controller 324 allows the heads 312 positioned at the outermost circumferential track to be moved inwardly by ½ track(=(a) position) across the disk 310 (FIG. 4). the program proceeds to step 704, at which the micro-controller 324 allows burst signals A, B, C and D to be written on a first disk surface by a first head while the disk 310 makes 1 rotation. At this time, the writing of the burst signals A, B, C and D is performed in a format as shown in a following table 1, while the disk 310 makes 1 rotation by regarding the applied sync clock(=servo sector time: $T_s$) as a period.

Table 1.

| Head Position | Burst signal | | | |
|---|---|---|---|---|
| | A | B | C | D |
| a | 1 | 0 | 0 | 1 |
| b | 1 | 0 | 1 | X |
| c | X | 1 | 1 | 0 |
| d | 0 | 1 | X | 1 |

After that, at subsequent step 706, each of a second, third and fourth heads writes burst signals A, B, C and D by successively delaying each servo sector sync time by $\frac{1}{4}(T_s)$ under the control of the micro-controller 324, as shown in FIG. 6. Subsequently, referring to steps 708 thru 712, the micro-controller 324 allows the heads to be moved again inwardly by ½ track(=(b) position) across the disk 310 (FIG. 4) using burst signal A of the burst signals A, B, C and D written on the first disk surface by the first head (step 708). Typically, since the amount of detected burst signals is directly proportional to a track area over which the head is positioned, the micro-controller 324 allows the head 312 to be moved inwardly by ½ track to a position (b) after normalizing a maximum signal level value as 1 in a detected waveform of burst signal A, and establishing 0.5 point of the detected waveform as a control command for head movement. Hence, a first head is used to read burst signal A for a control command for head movement while the disk 310 makes 1 rotation, and the remaining second, third and fourth heads write burst signals A, B, C and D in a format such as (b) in table 1 (step 710). Then, the writing of burst signals A, B, C and D on the position (b) of the first disk through the first head is executed by using burst signal A of a second disk read by a second head while the disk 310 makes 1 rotation (step 712). Referring to subsequent steps 714 thru 718, the micro-controller 324 allows the heads 312 to be moved by ½ track to a position (c) by normalizing a maximum signal level value as 1 in a detected waveform of burst signal C by using burst signal C written at the position (b), and establishing 0.5 point of the detected waveform as a control command for head movement as shown in FIG. 5 after writing all the burst signals A, B, C and D on the position (b) of each of the disks through each of the heads (step 714). Hence, the first head is used to read burst signal C for a control command for head movement while the disk 310 makes 1 rotation, and the remaining second, third and fourth heads write burst signals A, B, C and D in a format such as (c) in table 1 (step 716). Then, the writing of burst signals A, B, C and D on the position (c) of the first disk through the first head is executed by using burst signal C of the second disk read by the second head while the disk 310 makes 1 rotation (step 718). Referring to subsequent steps 720 thru 724, the micro-controller 324 allows the heads 312 to be moved inwardly by ½ track to a position (D) by normalizing a maximum signal level value as 1 in a detected waveform of burst signal B by using burst signal B written at the position (c), and establishing 0.5 point of the detected waveform as a control command for head movement as shown in FIG. 5 after writing all the burst signals A, B, C and D on the position (c) of each of the disks through each of the heads (step 720). Hence, the first head is used to read burst signal B for a control command for head movement while the disk 310 makes 1 rotation, and the remaining second, third and fourth heads write burst signals A, B, C and D in a format such as (d) in table 1(step 722). Then, the writing of burst signals A, B, C and D on the position (d) of the first disk through the first head is executed by using burst signal B of the second disk read by the second head while the disk 310 makes 1 rotation (step 724). The program proceeds to subsequent step 726 where it is determined by the micro-controller 324 whether or not burst signals A, B, C and D are all written on the last track of the disk 310. If it is determined at step 726 that the writing of burst signals A, B, C and D on the last track of the disk 310 is executed, the servo writing routine is concluded. If, on the other hand, burst signals A, B, C and D are not all written on last track on the disk 310, the preceding steps 708 thru 724 are executed again.

As a result, the burst signals A, B, C and D are written on entire tracks on each of the disk surfaces by performing the above servo writing operation repeatedly.

Figure 8:
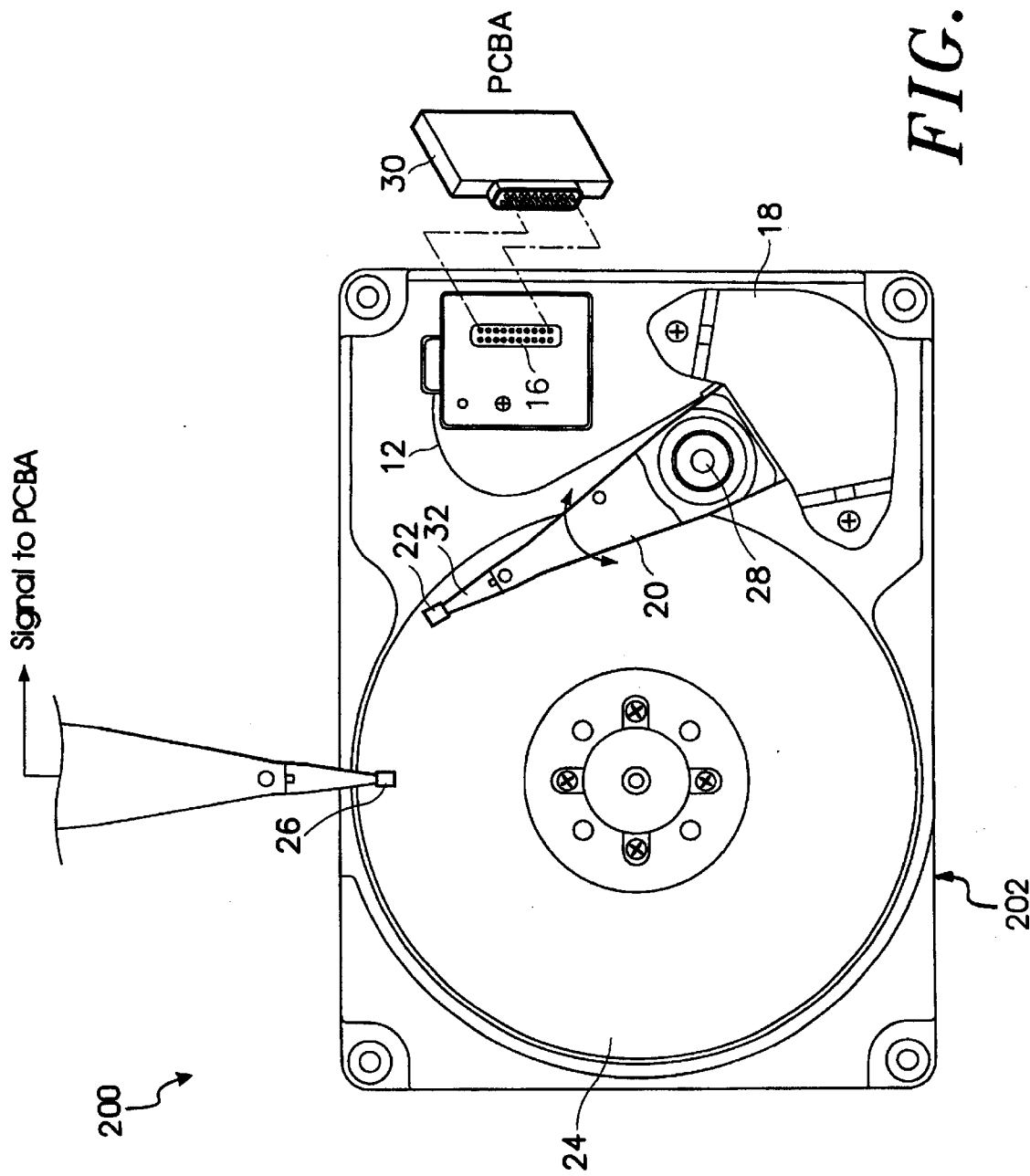
FIG. 8 is a schematic view illustrating a servo writing system for controlling the servo writing of the HDD according to another embodiment of the present invention.

FIG. 8 is a schematic view illustrating a servo writing system for controlling the servo writing of the HDD according to another embodiment of the present invention.

As seen in FIG. 8, the servo writing system 200 of this embodiment eliminates the need for a driver for driving an actuator arm 20 in the HDD 202 by using a laser in a servo writer. Therefore, the micro-controller (not shown) in the HDD 202 provides information for positioning the magnetic head 22 over an outermost circumferential track on a magnetic disk 24 by reading a sync clock signal written on the outermost circumferential track of magnetic disk 24 in the HDD 202 after connecting the HDD 202 to the servo writer and positioning a clock head 26 of the servo writer over the outermost circumferential track.

Consequently, the servo writing system 150 of FIG. 2, according to the previously described embodiment of the present invention, allows the magnetic head 22 to be positioned over the outermost circumferential track by making the actuator arm 20 contact the outer crash stop 10 after directly driving the actuator arm 20 through the VCM driver in the HDD 202. In contrast, in the servo writing system 200 of FIG. 8 according to another embodiment of the present invention, the micro-controller allows the magnetic head 22 to be positioned over the outermost circumferential track by making the clock head 26 of the servo writer read a sync clock signal written on the outermost circumferential track, and then apply that sync clock signal to the micro-controller (not shown) in the HDD 202. The servo writing procedure is then carried out in the same way as illustrated above with reference to FIGS. 4 to 7.

As described above, the present invention provides a method and apparatus for writing servo information on a magnetic disk through a magnetic head by directly driving an actuator of a HDD without employing a servo writer using the control of a laser. Furthermore, when there is need for increasing the density in TPI(Tracks per Inch) to achieve a high capacity of HDD, HDD manufacturers do not have to produce a next servo writer, and thus a savings in production cost is achieved.

While there have been illustrated and described what are considered to be preferred embodiments of the present invention, it will be understood by those skilled in the art that various changes and modifications and equivalents may be substituted for elements thereof without departing from the true scope of the present invention. Therefore, it is intended that the present invention not be limited to the particular embodiments disclosed as the best mode contemplated for carrying out the present invention, but that the present invention embraces all alternatives, modifications and variances falling within the scope of the appended claims.

What is claimed is:

1. A method of writing servo information, including head position identifying information, on a surface of a plurality of disks in a hard disk drive (HDD), comprising the steps of:
   (a) positioning each of a plurality of heads over an outermost circumferential track disposed on the surface of a corresponding disk of the plurality of disks in such a manner that an actuator contacts an outer crash stop based on a control command for writing servo information;
   (b) causing each of said plurality of said heads to write corresponding head position identifying information on a first half track area of said outermost circumferential track based on said control command for writing servo information;
   (c) moving each of said plurality of heads inwardly by ½ track across said corresponding disk so that each of said plurality of heads is positioned over a second half track area of said outermost circumferential track by using said corresponding head position identifying information written on said first half track area of said outermost circumferential track as a position control value;
   (d) causing each of said plurality of heads to write corresponding head position identifying information on said second half track area of said outermost circumferential track;
   (e) sequentially moving each of said plurality of heads inwardly by ½ track across said corresponding disk toward a next track in the same manner as in said step (c) using said corresponding head position identifying information written on said second half track area of said outermost circumferential tract as said position control value; and
   (f) causing each of said plurality of heads to write a plurality of head position identifying information on said corresponding disk in the same manner as in said step (d), thereby writing the servo information, including the head position identifying information, on all of the tracks of said surface of said corresponding disks;
   wherein step (b) comprises writing burst signals on a surface of a first disk through a first head, and writing said burst signals on a surface of each remaining one of said plurality of disks sequentially through second, third and fourth heads by delaying by one-quarter sector time for said each remaining one of said plurality of disks.

2. The method according to claim 1, wherein said control command for writing servo information is stored in a read-only memory (ROM) included in said HDD.

3. The method according to claim 1, further comprising the step of connecting said HDD to a servo writer including a clock head for detecting a sync clock written on an outermost circumferential track of said surface of said plurality of disks.

4. The method according to claim 1, wherein step (d) comprises writing burst signals on the surface of each of said plurality of disks through said second, third and fourth heads using a read signal from said first head.

5. The method according to claim 4, wherein step (d) further comprises writing burst signals on the surface of said first disk through said first head using a read signal from said second head.

6. The method according to claim 1, wherein step (d) comprises writing burst signals on the surface of said first disk through said first head using a read signal from said second head.

7. An apparatus for writing servo information, including head position identifying information, on a surface of a plurality of disks in a hard disk drive (HDD), said apparatus comprising:
   positioning means for positioning each of a plurality of heads over an outermost circumferential track disposed on the surface of a corresponding disk of the plurality of disks based on a control command for writing servo information;
   writing means for causing each of said plurality of said heads to write corresponding head position identifying information on a first half track area of said outermost circumferential track based on said control command for writing servo information; and
   moving means for moving each of said plurality of heads inwardly by ½ track across said corresponding disk so that each of said plurality of heads is positioned over a second half track area of said outermost circumferential track by using said corresponding head position identifying information written on said first half track area of said outermost circumferential track as a position control value;
   wherein said writing means causes each of said plurality of heads to write corresponding head position identifying information on said second half track area of said outermost circumferential track;
   wherein said moving means sequentially moves each of said plurality of heads inwardly by ½ track across said corresponding disk toward a next track using said corresponding head position identifying information written on said second halftrack area of said outermost circumferential tract as said position control value;
   wherein said writing means causes each of said plurality of heads to write a plurality of head identifying information on said corresponding disk, whereby the servo information, including the head position identifying information, is written on all of the tracks of said surface of said corresponding disks; and
   wherein said writing means writes burst signals on a surface of a first disk through a first head, and writes said burst signals on a surface of each remaining one of said plurality of disks sequentially through second, third and fourth heads by delaying by one-quarter sector time for said each remaining one of said plurality of disks.

8. The apparatus according to claim 7, further comprising read-only memory means for storing said control command for writing servo information.

9. The apparatus according to claim 7, wherein said HDD is connected to a servo writer;
   said apparatus further comprising clock head means for detecting a sync clock written on the outermost circumferential track of said surface of said plurality of disks; and
   wherein said writing means causes said each of said plurality of said heads to write the corresponding head position identifying information on said first half track area of said outermost circumferential track by synchronzing said corresponding head position identifying information with said sync clock detected by said clock head means.

10. The apparatus according to claim 7, wherein said writing means writes the burst signals on the surface of each of said plurality of disks through said second, third and fourth heads using a read signal from said first head.

11. The apparatus according to claim 10, wherein said writing means additionally writes the burst signals on the surface of said first disk through said first head using a further read signal from said second head.

12. The apparatus according to claim 7, wherein said writing means writes the burst signals on the surface of said first disk through said first head using a read signal from said second head.

13. A method of writing servo information, including head position identifying information, on a surface of a plurality of disks in a hard disk drive (HDD), comprising the steps of:

(a) positioning each of a plurality of heads over an outermost circumferential track disposed on the surface of a corresponding disk of the plurality of disks in such a manner that an actuator contacts an outer crash stop based on a control command for writing servo information;

(b) causing each of said plurality of said heads to write corresponding head position identifying information on a first half track area of said outermost circumferential track based on said control command for writing servo information;

(c) moving each of said plurality of heads inwardly by ½ track across said corresponding disk so that each of said plurality of heads is positioned over a second half track area of said outermost circumferential track by using said written corresponding head position identifying information written on said first half track area of said outermost circumferential track as a position control value;

(d) causing each of said plurality of heads to write corresponding head position identifying information on said second half track area of said outermost circumferential track;

(e) sequentially moving each of said plurality of heads inwardly by ½ track across said corresponding disk toward a next track in the same manner as in said step (c) using said corresponding head position identifying information written on said second half track area of said outermost circumferential tract as said position control value; and (f) causing each of said plurality of heads to write a plurality of head position identifying information on said corresponding disk in the same manner as in said step (d), thereby writing the servo information, including the head position identifying information, on all of the tracks of said surface of said corresponding disks;

wherein step (d) comprises writing burst signals on the surface of each of said plurality of disks through second, third and fourth heads using a read signal from a first head.

14. An apparatus for writing servo information, including head position identifying information, on a surface of a plurality of disks in a hard disk drive (HDD), said apparatus comprising:

positioning means for positioning each of a plurality of heads over said outermost circumferential track disposed on the surface of a corresponding disk of the plurality of disks based on a control command for writing servo information;

writing means for causing each of said plurality of said heads to write corresponding head position identifying information on a first half track area of said outermost circumferential track based on said control command for writing servo information; and moving means for moving each of said plurality of heads inwardly by ½ track across said corresponding disk so that each of said plurality of heads is positioned over a second half track area of said outermost circumferential track by using said corresponding head position identifying information written on said first half track area of said outermost circumferential track as a position control value;

wherein said writing means causes each of said plurality of heads to write corresponding head position identifying information on said second half track area of said outermost circumferential track;

wherein said moving means sequentially moves each of said plurality of heads inwardly by ½ track across said corresponding disk toward a next track using said corresponding head position identifying information written on said second half track area of said outermost circumferential tract as said position control value;

wherein said writing means causes each of said plurality of heads to write a plurality of head identifying information on said corresponding disk, whereby the servo information, including the head position identifying information, is written on all of the tracks of said surface of said corresponding disks; and wherein said writing means writes burst signals on the surface of each of said plurality of disks through second, third and fourth heads using a read signal from said first head.

15. A method of writing servo information, including head position identifying information, on surfaces of a plurality of disks in a hard disk drive (HDD), comprising the steps of:

(a) moving heads to an outermost circumferential track on a disk surface;

(b) moving said heads inwardly one-half track across said disk;

(c) writing burst signals on a surface of a first disk through a first head;

(d) writing burst signals on a surface of each remaining one of said disks sequentially through second, third and fourth heads by delaying by one-quarter sector time for said each remaining one of said plurality of disks;

(e) moving said heads inwardly one-half track across said disk using a first burst signal A;

(f) writing burst signals on the surface of each of said plurality of disks through second, third and fourth heads using a read signal from said first head; and (g) writing the burst signals on the surface of said first disk through said first head using a read signal from said second head.

16. The method according to claim 15, further comprising steps of:

(h) moving the heads inwardly one-half track across said disk using a third burst signal C; and (i) writing the burst signals on the surface of each of said plurality of disks through second, third and fourth heads using a read signal from said first head.

17. The method according to claim 16, further comprising the step of:

(j) writing the burst signals on the surface of said first disk through said first head using a read signal from said second head.

18. The method according to claim 17, further comprising the steps of:

(k) moving the heads inwardly one-half track across the disks using a second burst signal B; and (l) writing burst signals on the surfaces of each of said plurality of disks through second, third and fourth heads using a read signal from said first head.

19. The method according to claim 18, further comprising the step of:
(m) writing the burst signals on the surface of said first disk through a first head using a read signal from said second head.

20. The method according to claim 19, further comprising the steps of:
(n) determining whether a current track is a last track; and
(o) when the current track is the last track, returning to step (e).

21. A method of writing servo information, including head position identifying information, on surfaces of a plurality of disks in a hard disk drive (HDD), comprising the steps of:
(a) moving heads to an outermost circumferential track on a disk surface;
(b) moving said heads inwardly one-half track across said disk;
(c) writing burst signals on a surface of a first disk through a first head;
(d) writing burst signals on a surface of each remaining one of said disks sequentially through second, third and fourth heads by delaying by one-quarter sector time for said each remaining one of said plurality of disks; and
(e) writing the burst signals on the surface of said first disk through said first head using a read signal from said second head.

22. The method according to claim 21, further comprising steps of:
(f) moving the heads inwardly one-half track across said disk using a third burst signal C; and
(g) writing the burst signals on the surface of each of said plurality of disks through second, third and fourth heads using a read signal from said first head.

23. The method according to claim 22, further comprising the step of:
(h) writing the burst signals on the surface of said first disk through said first head using a read signal from said second head.

24. The method according to claim 23, further comprising the steps of:
(i) moving the heads inwardly one-half track across the disks using a second burst signal B; and
(j) writing burst signals on the surfaces of each of said plurality of disks through second, third and fourth heads using a read signal from said first head.

25. The method according to claim 24, further comprising the step of:
(k) writing the burst signals on the surface of said first disk through a first head using a read signal from said second head.

26. The method according to claim 25, further comprising the steps of:
(l) determining whether a current track is a last track; and
(m) when the current track is the last track, moving said heads inwardly one-half track across said disk using a first burst signal A.

* * * * *